US008630984B1

(12) United States Patent
Gardner et al.

(10) Patent No.: US 8,630,984 B1
(45) Date of Patent: Jan. 14, 2014

(54) SYSTEM AND METHOD FOR DATA EXTRACTION FROM EMAIL FILES

(75) Inventors: Daniel John Gardner, St. Louis Park, MN (US); Mark Anthony Seel, Roseville, MN (US)

(73) Assignee: Renew Data Corp., Austin, TX (US)

( * ) Notice: Subject to any disclaimer, the term of this patent is extended or adjusted under 35 U.S.C. 154(b) by 298 days.

(21) Appl. No.: 10/759,663

(22) Filed: Jan. 16, 2004

Related U.S. Application Data

(63) Continuation-in-part of application No. 10/697,728, filed on Oct. 30, 2003, now abandoned.

(60) Provisional application No. 60/440,855, filed on Jan. 17, 2003, provisional application No. 60/440,728, filed on Jan. 17, 2003.

(51) Int. Cl.
*G06F 17/30* (2006.01)

(52) U.S. Cl.
USPC ............ 707/661; 707/756; 707/922; 709/206

(58) Field of Classification Search
USPC .......................... 707/661, 756, 922; 709/206
See application file for complete search history.

(56) References Cited

U.S. PATENT DOCUMENTS

| | | | |
|---|---|---|---|
| 5,107,419 A | 4/1992 | MacPhail | |
| 5,350,303 A | 9/1994 | Fox et al. | |
| 5,535,381 A | 7/1996 | Kopper | |
| 5,617,566 A | 4/1997 | Malcolm | |
| 5,689,699 A | 11/1997 | Howell et al. | |
| 5,717,913 A | 2/1998 | Driscoll | |
| 5,732,265 A | 3/1998 | Dewitt et al. | |
| 5,742,807 A | 4/1998 | Masinter | |
| 5,778,395 A | 7/1998 | Whiting et al. | |
| 5,813,009 A | 9/1998 | Johnson et al. | |
| 5,813,015 A | 9/1998 | Pascoe | |
| 5,926,811 A | 7/1999 | Miller et al. | |
| 5,937,401 A | 8/1999 | Hillegas | |
| 5,982,370 A | 11/1999 | Kamper | |
| 6,023,710 A | 2/2000 | Steiner et al. | |
| 6,047,294 A | 4/2000 | Deshayes et al. | |
| 6,157,931 A | 12/2000 | Cane et al. | |
| 6,182,029 B1 | 1/2001 | Friedman | |
| 6,189,002 B1 | 2/2001 | Roitblat | |
| 6,199,067 B1 | 3/2001 | Geller | |
| 6,199,081 B1 | 3/2001 | Meyerzon et al. | |

(Continued)

OTHER PUBLICATIONS

Amati, G. et al.; "Probabilistic Models of Information Retreival Based on Measuring the Divergence from Randomness"; ACM Transactions on Information Systems, vol. 20, No. 4. Oct. 2002.

(Continued)

*Primary Examiner* — Alicia Lewis
(74) *Attorney, Agent, or Firm* — Berry & Associates P.C.

(57) ABSTRACT

A method and system can be used to read and obtain data from messaging files regardless of the messaging environment used to generate the messaging files. The method and system can read part of a messaging file to identify the type of entry (e.g., email message, calendar item, address book entry, etc.) and access information on where information within the entry is located within the messaging file based on an identifying signature. The method and system can be used to obtain data from messaging files without having to recreate the messaging environment, including individual email accounts. The data can be stored in a target storage medium in a format that is more usable and more easily searched.

18 Claims, 4 Drawing Sheets

(56) References Cited

U.S. PATENT DOCUMENTS

| | | | |
|---|---|---|---|
| 6,216,123 B1 | 4/2001 | Robertson et al. | |
| 6,226,630 B1 | 5/2001 | Billmers | |
| 6,226,759 B1 | 5/2001 | Miller et al. | |
| 6,240,409 B1 | 5/2001 | Aiken | |
| 6,243,713 B1 | 6/2001 | Nelson et al. | 1/1 |
| 6,256,633 B1 | 7/2001 | Dharap | |
| 6,269,382 B1 | 7/2001 | Cabrera et al. | |
| 6,278,992 B1 | 8/2001 | Curtis et al. | |
| 6,324,548 B1 | 11/2001 | Sorenson | |
| 6,389,403 B1 | 5/2002 | Dorak | |
| 6,421,767 B1 | 7/2002 | Mililo et al. | |
| 6,477,544 B1 | 11/2002 | Bolosky et al. | |
| 6,493,711 B1 | 12/2002 | Jeffrey | |
| 6,662,198 B2 | 12/2003 | Satyanarayanan et al. | 1/1 |
| 6,708,165 B2 | 3/2004 | Jeffrey | |
| 6,745,197 B2 | 6/2004 | McDonald | |
| 6,751,628 B2 | 6/2004 | Coady | |
| 6,778,979 B2 | 8/2004 | Grefenstette et al. | |
| 6,810,395 B1 | 10/2004 | Bharat | |
| 6,834,110 B1 | 12/2004 | Marconcini et al. | |
| 6,859,800 B1 | 2/2005 | Roche et al. | |
| 6,915,435 B1 | 7/2005 | Merriam | |
| 6,928,526 B1 | 8/2005 | Zhu et al. | |
| 6,947,954 B2 | 9/2005 | Cohen et al. | |
| 6,954,750 B2 | 10/2005 | Bradford | 1/1 |
| 6,996,580 B2 | 2/2006 | Bae et al. | |
| 7,047,386 B1 | 5/2006 | Ngai et al. | |
| 7,089,286 B1 | 8/2006 | Malik | |
| 7,137,065 B1 | 11/2006 | Huang et al. | |
| 7,146,388 B2 | 12/2006 | Stakutis et al. | |
| 7,174,368 B2 * | 2/2007 | Ross, Jr. | 709/207 |
| 7,260,568 B2 | 8/2007 | Zhang et al. | |
| 7,269,564 B1 | 9/2007 | Milsted et al. | |
| 7,284,191 B2 | 10/2007 | Grefenstette et al. | |
| 7,287,025 B2 | 10/2007 | Wen et al. | |
| 7,313,556 B2 | 12/2007 | Gallivan et al. | |
| 7,325,041 B2 | 1/2008 | Hara et al. | |
| 7,458,082 B1 | 11/2008 | Slaughter et al. | 719/328 |
| 7,526,478 B2 | 4/2009 | Friedman | |
| 7,533,291 B2 | 5/2009 | Lin | |
| 7,650,341 B1 | 1/2010 | Oratovsky et al. | |
| 2002/0002468 A1 | 1/2002 | Spagna et al. | |
| 2002/0019814 A1 | 2/2002 | Ganesan | |
| 2002/0038296 A1 | 3/2002 | Margolus et al. | |
| 2002/0059317 A1 * | 5/2002 | Black et al. | 707/200 |
| 2002/0107803 A1 | 8/2002 | Lisanke et al. | |
| 2002/0107877 A1 | 8/2002 | Whiting et al. | |
| 2002/0116402 A1 | 8/2002 | Luke | |
| 2002/0120925 A1 | 8/2002 | Logan | |
| 2002/0138376 A1 | 9/2002 | Hinkle | |
| 2002/0140960 A1 | 10/2002 | Ishikawa | |
| 2002/0143737 A1 | 10/2002 | Seki et al. | |
| 2002/0143871 A1 * | 10/2002 | Meyer et al. | 709/204 |
| 2002/0147733 A1 | 10/2002 | Gold et al. | |
| 2002/0161745 A1 | 10/2002 | Call | 707/1 |
| 2002/0178176 A1 | 11/2002 | Sekiguchi et al. | |
| 2002/0194324 A1 | 12/2002 | Guha | |
| 2003/0028889 A1 | 2/2003 | McCoskey et al. | |
| 2003/0069803 A1 | 4/2003 | Pollitt | |
| 2003/0069877 A1 | 4/2003 | Grefenstette et al. | |
| 2003/0105718 A1 | 6/2003 | Hurtado et al. | |
| 2003/0110130 A1 | 6/2003 | Pelletier | |
| 2003/0126247 A1 | 7/2003 | Strasser et al. | |
| 2003/0126362 A1 | 7/2003 | Camble et al. | |
| 2003/0135464 A1 | 7/2003 | Mourad et al. | |
| 2003/0145209 A1 | 7/2003 | Eagle et al. | |
| 2003/0182304 A1 | 9/2003 | Summerlin et al. | |
| 2003/0233455 A1 | 12/2003 | Leber et al. | |
| 2004/0034632 A1 | 2/2004 | Carmel et al. | |
| 2004/0054630 A1 | 3/2004 | Ginter et al. | |
| 2004/0064447 A1 | 4/2004 | Simske et al. | |
| 2004/0064537 A1 | 4/2004 | Anderson et al. | |
| 2004/0068604 A1 | 4/2004 | Le et al. | |
| 2004/0083211 A1 | 4/2004 | Bradford | 707/3 |
| 2004/0143609 A1 | 7/2004 | Gardner et al. | |
| 2004/0158559 A1 | 8/2004 | Poltorak | 707/3 |
| 2004/0186827 A1 | 9/2004 | Anick et al. | |
| 2004/0193695 A1 * | 9/2004 | Salo et al. | 709/216 |
| 2004/0205448 A1 | 10/2004 | Grefenstette et al. | |
| 2005/0097081 A1 | 5/2005 | Sellen et al. | |
| 2005/0097092 A1 | 5/2005 | Annau et al. | |
| 2005/0144157 A1 | 6/2005 | Moody et al. | |
| 2005/0160481 A1 | 7/2005 | Todd et al. | |
| 2005/0223067 A1 | 10/2005 | Buchheit et al. | |
| 2005/0234843 A1 | 10/2005 | Beckius et al. | |
| 2005/0283473 A1 | 12/2005 | Rousso et al. | |
| 2006/0167842 A1 | 7/2006 | Watson | 707/3 |
| 2006/0173824 A1 | 8/2006 | Bensky et al. | |
| 2006/0230035 A1 | 10/2006 | Bailey et al. | |
| 2007/0011154 A1 | 1/2007 | Musgrove et al. | |
| 2007/0033177 A1 | 2/2007 | Friedman | |
| 2007/0033183 A1 | 2/2007 | Friedman | |
| 2007/0033410 A1 * | 2/2007 | Eagle et al. | 713/176 |
| 2007/0038616 A1 | 2/2007 | Guha | |
| 2007/0050339 A1 | 3/2007 | Kasperski et al. | 707/3 |
| 2007/0050351 A1 | 3/2007 | Kasperski et al. | 707/4 |
| 2007/0061335 A1 | 3/2007 | Ramer et al. | |
| 2007/0088687 A1 | 4/2007 | Bromm et al. | |
| 2007/0192284 A1 | 8/2007 | Finley et al. | |
| 2007/0198470 A1 | 8/2007 | Freedman et al. | |
| 2007/0233692 A1 | 10/2007 | Lisa et al. | |
| 2007/0245108 A1 | 10/2007 | Yasaki et al. | |
| 2007/0253643 A1 | 11/2007 | Nagarajan | |
| 2007/0255686 A1 | 11/2007 | Kemp et al. | |
| 2007/0266009 A1 | 11/2007 | Williams | |
| 2007/0282811 A1 | 12/2007 | Musgrove | |
| 2007/0282826 A1 | 12/2007 | Hoeber et al. | |
| 2007/0288450 A1 | 12/2007 | Datta et al. | |
| 2008/0005651 A1 | 1/2008 | Grefenstette et al. | |
| 2008/0059187 A1 | 3/2008 | Roitblat et al. | |
| 2008/0059512 A1 | 3/2008 | Roitblat et al. | |
| 2008/0077570 A1 | 3/2008 | Tang et al. | |
| 2008/0097975 A1 | 4/2008 | Guay et al. | |
| 2008/0104032 A1 | 5/2008 | Sarkar | |
| 2008/0147644 A1 | 6/2008 | Aridor et al. | |
| 2008/0162498 A1 | 7/2008 | Omoigui | |
| 2008/0195601 A1 | 8/2008 | Ntoulas et al. | |
| 2009/0024612 A1 | 1/2009 | Tang et al. | |
| 2009/0182737 A1 | 7/2009 | Melman | |

OTHER PUBLICATIONS

Attar et al., "Local Feedback in Full-Text Retrieval Systems", Journal of the ACM (JACM), vol. 24, Issue 3 (Jul. 1977), pp. 397-417, ISSN:0004-5411.

Cai et al., "Automatic Query Expansion Based on Directed Divergence", Proceedings of the International Conference on Information Technology: Coding and Computing, p. 8, 2002, ISBN:0-7695-1506-1.

Cohen, E. et al.; "Processing Top k Queries from Samples"; ACM.

Conlon, S., "Automatic Web Searching and Categorizing Using Query Expansion and Focusing", (Mississippi University.), 6p, Jan. 2003.

Crestani, F. et al.; "Is This Document Relevant? . . . Probably": A Survey of Probabilistic Models in Information Retrieval; ACM Computing Surveys vol. 30, No. 4, Dec. 1998.

E. M. Voorhees, "Query expansion using lexical-semantic relations", Annual ACM Conference on Research and Development in Information Retrieval, Proceedings of the 17th annual international ACM SIGIR conference on Research and development in information retrieval, 1994, Dublin, Ireland, Aug. 1994, pp. 61-69, ISBN:0-387-1988-X.

Gauch et al., "A Corpus Analysis Approach for Automatic Query Expansion and Its Extension to Multiple Databases" *ACM Transactions on Information Systems*, vol. 17, No. 3, Jul. 1999, pp. 250-269.

Gehler, P. et al.; "The Rate Adapting Poisson Model for Information Retrieval and Object Recognition"; Proceedings of the 23rd International Conference on Machine Learning, 2006.

http://www.googleguide.com/tools.html <retrieved on Jul. 8, 2009>.
http://www.lexisnexis.com/toolbar/help/using.
htm#HighlightAndClick <retrieved on Jul. 8, 2009>.

(56) References Cited

OTHER PUBLICATIONS

Ilyas, I. et al.; "Adaptive Rank-Aware Query Optimization in Relational Databases"; ACM Transactions on Database Systems; vol. 31. No. 4, Dec. 2006.

Luk, R. et al.; "A Comparison of Chinese Document Indexing Strategies and Retrieval Models"; ACM Transactions on Asian Language Information Processing, vol. 1, No. 3, Sep. 2002.

Margulis, E.; "Modelling Documents with Multiple Poisson Distributions"; Information Processing & Management vol. 29, No. 2, 1993.

Margulis, E.; "N-Poisson Document Modelling"; SIGIR '92.

Mei, Q. et al.; "A Study of Poisson Query Generation Model for Information Retrieval"; SIGIR '07 Proceedings, Session 12: Formal Models.

Mitra et al., "Improving Automatic Query Expansion", Annual ACM Conference on Research and Development in Information Retrieval, Proceedings of the 21st annual international ACM SIGIR conference on Research and development in information retrieval, Melbourne, Australia, pp. 206-214, Year of Publication: 1998, ISBN:1-58113-015-5.

Ozmutlu, H. et al.; "Analysis of large data logs: an application of Poisson sampling on excite web queries"; Information Processing and Management, vol. 38, 2002.

Robertson, S. et al.; "Some Simple Effective Approximations to the 2-Poisson Model for Probabilistic Weighted Retreival"; Centre for Interactive Systems Research, London.

Roelleke, T.; "A Frequency-based and a Poisson-based Definition of the Probability of Being Informative"; SIGIR '03.

Tao, Y. et al.; "Indexing Multi-Dimensional Uncertain Data with Arbitrary Probability Density Functions"; Proceedings of the 31st VLDB Conference, Norway 2005.

Volkmer et al., "Exploring Automatic Query Refinement for Text-Based Video Retrieval", *IEEE International Conference on Multimedia and Expo*, Jul. 9-12, 2006, pp. 765-768, Toronto, Ont., ISBN: 1-4244-0366-7.

Xu et al., "Query expansion using local and global document analysis," in Proc. of ACM-SIGIR 1996, Zurich, Switzerland, Aug. 18-22, 1996, pp. 4-11.

Yan, T. et al.; "The SIFT Information Dissemination System"; ACM Transactions on Database Systems, vol. 24, No. 4, Dec. 1999.

Zakariah, R. et al.; "Detecting Junk Mails by Implementing Statistical Theory"; IEEE Proceedings of the 20th International Conference on Advanced Information Networking and Applications, 2006.

Roitblat, Herbert L. (2004), "Electronic Data Are Increasingly Important to Successful Litigation", Trends in Electronic Data.

Roitblat, Herbert L. (2005), "Document Retrieval", DolphinSearch, Inc.

"The Sedona Principles: Best Practices Recommendations & Principles for Addressing Electronic Document Production," *The Sedona Conference Working Group Series*, Jul. 2005 Version.

Meng, W., et al., "Building Efficient and Effective Metasearch Engines," *ACM Computing Surveys, ACM*, New York, NY, US, US, vol. 34, No. 1, Mar. 1, 2002, pp. 48-89.

Comparing IBM Tivoli Storage Manager and VERITAS NetBackup in Real-World Environments. A summary by IBM of the whitepaper and benchmark written by Progressive Strategies, Nov. 8, 2002.

Beyond Backup Toward Storage Management by M. Kaczmarski, T. Jiang and D.A. Pease. IBM Systems Journal, vol. 42, pp. 322-337, Nov. 2, 2003.

PCT Search Report and Written Opinion dated Jun. 18, 2008, PCT/US07/13483.

PCT Search Report and Written Opinion dated May 8, 2009, PCT/US2009/032990.

\* cited by examiner

FIG. 4

SYSTEM AND METHOD FOR DATA EXTRACTION FROM EMAIL FILES

RELATED APPLICATIONS

This application claims priority under 35 U.S.C. §119(e) to U.S. Patent Application Nos. 60/440,855 entitled "System and Method for Data Extraction in a Non-Native Environment, Data De-Duplication, Database Creation and Manipulation, Image Back-up and PST File Monitoring" by Gardner et al. filed Jan. 17, 2003, and 60/440,728 entitled "Method and System for Enterprise-Wide Retention of Digital or Electronic Data" by Robert Gomes filed Jan. 17, 2003. This application claims priority under 35 U.S.C. §120 to and is a continuation-in-part of U.S. patent application Ser. No. 10/697,728, entitled "System and Method for Data Extraction in a Non-Native Environment" by Gardner et al. filed Oct. 30, 2003 now abandoned. This application is related to U.S. patent application Ser. No. 10/759,622 entitled "Method and System for Enterprise-Wide Retention of Digital or Electronic Data" by Gomes filed on Jan. 16, 2004, Ser. No. 10/759,599, entitled "System and Method for Data De-Duplication" by Gardner et al. filed on Jan. 16, 2004, Ser. No. 10/759,623, entitled "System and Method for a Data Extraction and Backup Database" by Gardner et al. filed on Jan. 16, 2004, Ser. No. 10/759,643 entitled "Method and System for Forensic Imaging to Virtual Media" by Gardner et al. filed on Jan. 16, 2004, and Ser. No. 10/760,010 entitled "System and Method of Monitoring a Personal Folder File" by Gardner et al. filed on Jan. 16, 2004.

FIELD OF THE INVENTION

This invention is related to obtaining of data from messaging files, and more particularly, to methods and systems to obtain data from messaging files in order to extract electronic data from such messaging files and store the data in a different format.

DESCRIPTION OF THE RELATED ART

Vast amounts of active and archived corporate electronic information exist on backup tape media. This information is increasingly becoming the target of opposing litigation attorneys or increasingly important as a source of information for knowledge management. Conventional methods of producing data from large quantities of backup tapes are difficult to implement, cost prohibitive, or both.

A problem with managing data from backup media is particularly problematic with companies having many different tape backup systems using different backup environments. A previous attempt to solve the problem of retrieving information from backup tapes involves restoring the tapes using a "Native Environment" (NE) approach. The NE approach recreates the original backup environment from which the tape was generated so that data from the tapes can be restored and moves the restored data from the replicated environment to a target storage system for further analysis.

Replicating the NE in order to restore backup tapes requires that all server names, configurations, software versions, user names, and passwords are consistent with the environment as it stood at the time of the backup. Replicating all of this information becomes quite challenging as systems age, names of systems change, passwords change, software versions change, and administrators change. Furthermore, backup software is typically designed to restore data for the purposes of disaster recovery (an all or nothing proposition) and not to intelligently process large amounts of data from large numbers of media to obtain only relevant information.

Even if the backup environment can be recreated, all the records may need to be examined. Those records may be for over thousand employees in a large company. Managing all this data is a nightmare even if the environment can be recreated. For many companies, the amount of information can exceed a terabyte. Storing over a terabyte of information takes a lot of memory space and consumes valuable computer resources during the storing operation.

Beyond trying to manage the shear volume of data, other problems exist. Passwords of former employees may need to be replicated. Further, operating and backup applications become obsolete over time. In other instances, the information can only be backed up onto a specific machine that may no longer exist. Simply put, trying to extract any or all data from a large number backup tapes generated from different backup environments is difficult.

Working with messaging systems adds further complexity. The database files for a single messaging system may have different formats and attributes depending on whether the database file is for a message, a calendar item, a contact (an address book entry), or the like. Currently, about the only way to extract the data is to replicate the messaging environment including individual email accounts. Replication of the messaging environment may be impossible, or if not impossible, replication is costly, time consuming, or both.

SUMMARY OF THE INVENTION

A method and system can be used to read and obtain data from messaging files regardless of the messaging environment used to generate the messaging files. The method and system can read part of a messaging file to identify the type of entry (e.g., email message, calendar item, address book entry, etc.) and access information on where information within the entry is located within the messaging file based on an identifying signature. The method and system can be used to obtain data from messaging files without having to recreate the messaging environment, including individual email accounts. The data can be stored in a target storage medium in a format that is more usable and more easily searched.

In one set of embodiments, a method of obtaining data from a messaging file can include identifying an entry within the messaging file. The method can also include extracting electronic data corresponding to the entry. The method can further include storing the electronic data in a different format.

In another set of embodiments, a data processing system readable medium can have code embodied therein. The code can comprise instructions for carrying out the methods described herein.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures.

FIG. 4 includes an illustration of a view of a hex editor that shows an identifying signature for an EDB file.

Figure 1:
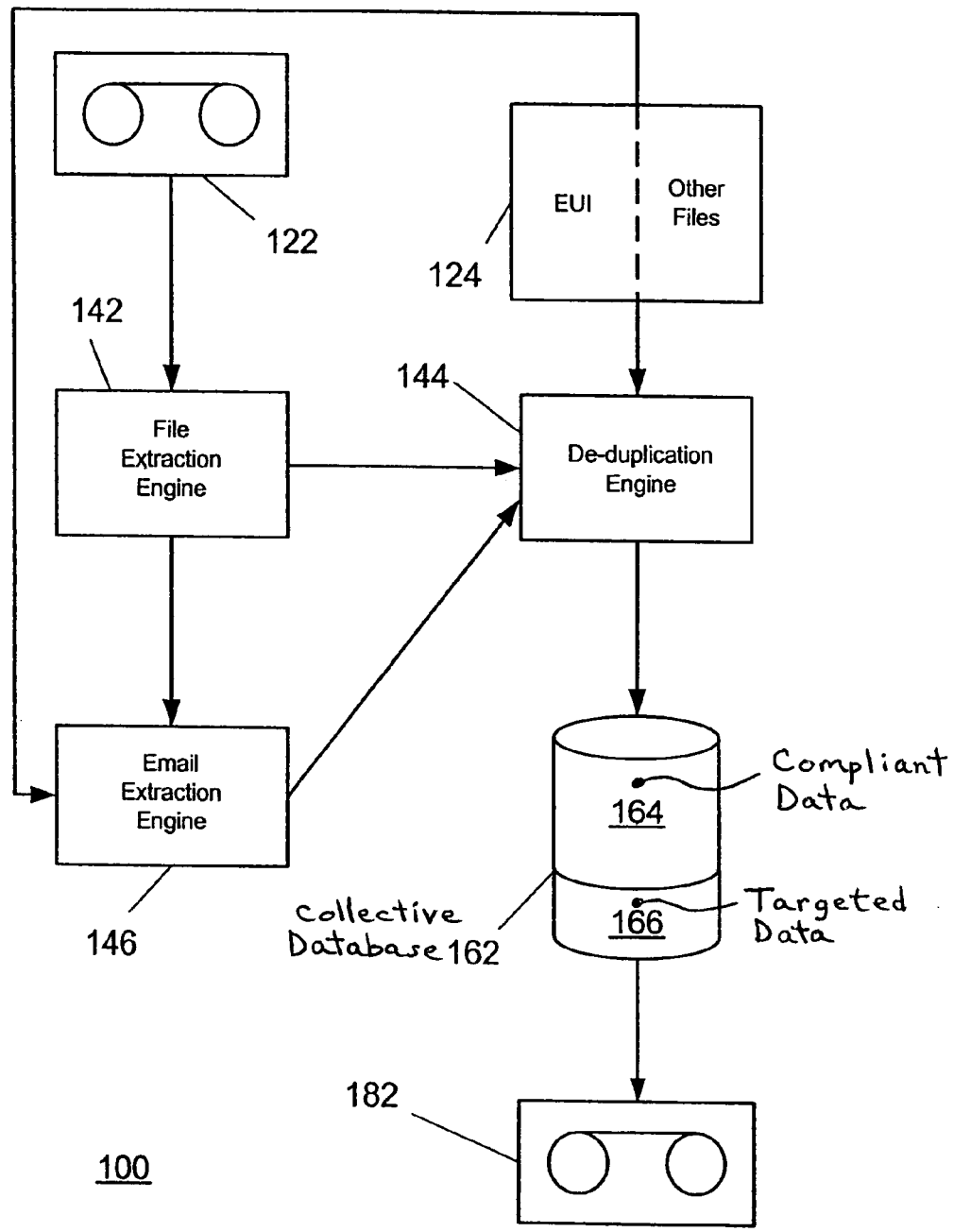
FIG. 1 includes an illustration of a system for managing data within an enterprise.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

The methods and systems described in more detail below can be used to extract data directly from messaging files and store the data in a more usable format within a target storage system. By circumventing recreation of the messaging environment, including individual email accounts, the methods and systems can eliminate the expense of hardware and time spent configuring software that is usually required in order to properly replicate a messaging environment.

Data extraction can now be performed in heterogeneous environments without having to recreate the messaging environment. A suite of software applications can be used to read tapes from any environment, any operating system, basically any host platforms and any backup system tape, more specifically, and process data from the messaging file and store it in a target storage system without having to recreate the messaging environment, including individual email accounts. The method and system described herein can obtain the data from entries within a messaging file and interpret that data without reliance on the messaging environment used to create that file. After the data is extracted, the data can be stored in a more usable form, such as within a database that can be readily searched.

Optionally, filtering the electronic data based on parameter(s) of interest (dates, file type, keyword searching, any metadata, etc.) can be performed as the electronic data is read from the messaging file and before storing the electronic data on the virtual media or other media at the target sub-system (e.g., all data can be read from the messaging files and placed on the virtual or other media). The method and system can track the location of all original data as it is placed in a database at the target sub-system.

Before describing the system and method in more detail, a few terms are defined or clarified to aid in understanding of the invention. The term "messaging" is intended to mean related to communication or communications resources. For example, a messaging environment may include the hardware, software, database(s), files, or any combination thereof used to operate an email system. The messaging environment includes individual email accounts. A messaging file may include information including email messages, calendar items, address books, and the like.

The term "tape" is used generally to describe any form of electronic storage media from which electronic data can be retrieved. The term "backup tape" is used to refer to a tape used to store backup data or information. Backup tapes are not limited only to tape drives, and can include hard disk drives, CD-ROMs, flash cards, or other persistent data storage medium.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

FIG. 1 illustrates one embodiment of system 100 that can be used to manage electronic data within an enterprise. Two sources of original data can include conventional backup tape(s) 122 and network 124 for the enterprise. Data on network 124 can include both End-User Information ("EUI") and other files as shown in FIG. 1. EUI may include nearly any information generated or collected by users of computers (not shown) that may be backed up by network 124. The other files may include applications used to generate the EUI, such as accounting programs, engineering validation programs, word processing programs, and the like.

System 100 can further comprise file extraction engine 142, de-duplication engine 144, email extraction engine 146, collective database 162, and backup tape(s) 182, each of which is addressed below. File extraction engine 142 is coupled to backup tape(s) 122 and can separate email files from other files. Email extraction engine 146 is coupled to file extraction engine 142 and can extract data regarding the email without the need of recreating email accounts. De-duplication engine 144 is coupled electronically to network 124, file extraction engine 142, and email extraction engine 146 and can save one copy of content for a file or email entry and metadata for the file or email entry. Such metadata may include information regarding which computers (not shown in FIG. 1) on which copies of the file or email entry can be found. Collective database 162, into which data is stored (e.g., including targeted data 166 and compliant data 164), is coupled electronically to de-duplication engine 144. The distinction between targeted data 166 and compliant data 164 is that one meets a criterion and the other does not. In one embodiment, the compliant data 164 meets the criterion, and in another embodiment, the targeted data 166 meets the criterion. The system can further comprise backup tape 182 is coupled electronically to collective database 162 and may include at least a portion of data from collective database 162. In FIG. 1, arrows illustrate the principle direction of data flow in system 100. After reading this specification, skilled artisans will appreciate that the various components can be unidirectionally or bi-directionally coupled to one another.

The components shown in FIG. 1 may be operated by one or more computers. Each of the computers can comprise a central processing unit ("CPU"), a read-only memory ("ROM"), a random access memory ("RAM"), a hard drive ("HD") or storage memory, and I/Os. I/Os can include a keyboard, monitor, printer, electronic pointing device (e.g., mouse, trackball, stylus, etc.), or the like. Each of the computers may have more than one CPU, ROM, RAM, HD, I/O, or other hardware components.

Portions of the methods described herein may be implemented using a computer program that can operate on one or more computers. The computer program can include code that comprises instructions to carry out the method described herein. The computer program may be stored on a tangible medium, such as ROM, RAM, HD, a DASD array, magnetic tape, floppy diskette, optical storage device, or other appropriate computer readable medium.

In an illustrative embodiment of the invention, the computer-executable instructions may be lines of assembly code, compiled C, C++, Java, or other language code. Other architectures may be used. For example, the functions of any one of the computers may be performed by a different computer. Additionally, a computer program or its software components with such code may be embodied in more than one computer.

A principal focus of the system and method described herein is directed to email extraction engine 146. Still, other portions of system 100, and particularly file extraction engine 142, may be described to aid in understanding of the method and system described in more detail below. The method and system can involve taking electronic data from messaging files from backup tapes 122, network 124, or both without having to recreate the messaging environment or individual email accounts (e.g., *.pst files). The data from the messaging systems can be put into a useable, searchable form, so that later access to the data can be performed without needing to recreate the messaging environment.

A brief overview of one embodiment is described with respect to FIGS. 1 (system diagram) and 2 (process flow diagram). A more detailed description follows the overview. In one embodiment, the method includes identifying messaging files on backup tape 122 and network 124 at step 204 in FIG. 2, and sending messaging files to email extraction engine 146 at steps 206 and 222. The method can also include identifying the entries within the messaging files using email extraction engine 146 at step 242. The method can further include extracting data from the messaging files using email extraction engine 146 at step 244. The method can still further include forwarding the electronic data from email extraction engine 146 to de-duplication engine 144 at step 246. After processing by the de-duplication engine, electronic data can then be stored in collective database 162. In an alternative embodiment (not shown), the de-duplication engine 144 could be bypassed; however, duplicate copies of content within email entries may be stored in collective database 162 if de-duplication engine 144 is not used.

A more detail description of the method and system is given in accordance with non-limiting, exemplary embodiments of the present invention. At the beginning of the method described, in one embodiment, system 100 can include messaging files that reside within backup tape 122 or on network 124. The method includes identifying messaging files on backup tape 122 and network 124. The procedure for identifying the messaging files on backup tape 122 involves intervening activities. Therefore, the procedure for backup tape 122 is addressed before the procedure for network 124.

The backup tape 122 may have been generated during a routine back up of a computer (not shown) using a conventional backup system. Intervening activities are used to extract files from backup tape 122 using file extraction engine 142. Initially, data may have been backed up onto backup tape 122 from any number of systems. Those systems may have different backup environments. File extraction engine 142 can communicate with the hardware to understand the stored data formats/hardware protocols (e.g., SCSI) in order to read the raw data as shown in step 202. In this embodiment, file extraction engine 142 interprets/reverse engineers the data from backup tape 122 (e.g., extract the data directly from the backup tape 122 by understanding the system (e.g., UNIX TAR) and the protocols used in storing the data)). A more detailed description of the communication and interpretation/reverse engineering are given in U.S. patent application Ser. Nos. 10/697,728 entitled "System and Method for Data Extraction in a Non-Native Environment" by Gardner et al. filed Oct. 30, 2003, and 60/440,855 entitled "System and Method for Data Extraction in a Non-Native Environment, Data De-Duplication, Database Creation and Manipulation, Image Back-up and PST File Monitoring" by Gardner et al. filed Jan. 17, 2003.

File extraction engine 142 identifies the backup system used to generate backup tape 122. Non-limiting examples of backup systems include Backup Exec™, ARCserve™ or UNIX TAR. After determining the backup system for generating backup tape 122, a lookup table can be used to determine where different portions of the data for a file are located.

Figure 3:
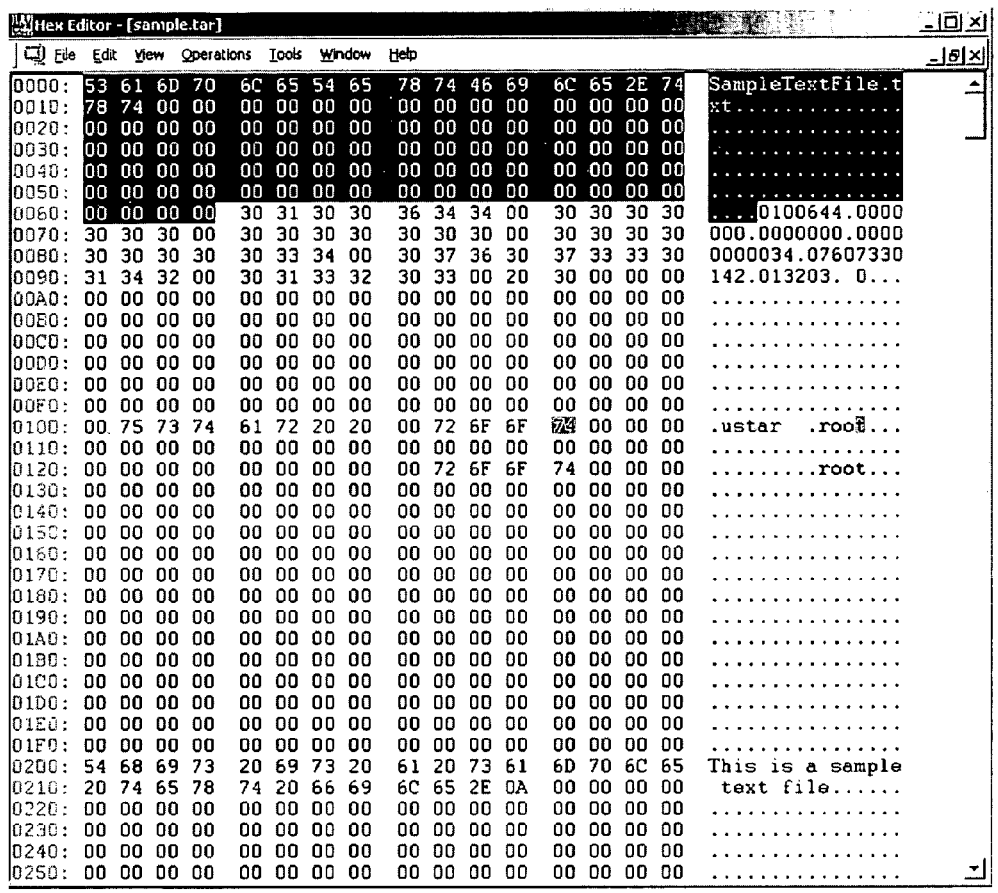
FIG. 3 includes an illustration of a view of a hex editor that shows an identifying signature for a backup system.

In one embodiment, the output from reading part of backup tape 122 is illustrated in the hex editor display of FIG. 3. In the embodiment illustrated in FIG. 3, the left-hand portion represents the offset value, the center portion includes hexadecimal values of the information, and the right-hand portion represents ASCII characters corresponding to the hexadecimal values. At offset 0x101 (257 bytes from the beginning), "ustar" can be seen. From this information, file extraction engine 142 can identify the backup system used to generate backup tape 122 as a UNIX TAR backup application. Many other types of backup applications could be used and would be identified in a similar manner. After the backup system used to generate backup tape 122 is known, a lookup table can be accessed. The look up table may include information related to what data is stored and where it is located on the tape for a file saved using the backup system. For the UNIX TAR backup application, the file name title is at offset 0x0 (0 bytes from the beginning of the file). In FIG. 3, the file name is "SampleTextFile.txt." The file name includes a base portion ("SampleTextFile") and a file name extension ("txt") separated from the base portion by a dot.

File extraction engine 142 can then use the file name extension to identify messaging files on backup tape 122 (step 204). The messaging files may be used with messaging systems, such as Microsoft Exchange™, Lotus Notes™, Eudora™, or the like. In one specific embodiment, Microsoft Exchange™ systems may be used, and Exchange Database ("EDB") files are the messaging files being identified. The EDB files have a file name extension of "edb", and therefore, file extraction engine 142 searches for EDB files, which have file names of "*.edb", wherein "*" represents the base portion of the file name and may be one or more characters long. Other messaging systems, including Lotus Notes™, Eudora™, or the like, may have similar file name extensions to identify messaging files. The file illustrated in FIG. 3 is a text file and is not a messaging file. Therefore, SampleTextFile.txt is not forwarded to email extraction engine 146.

Information on network 124 may include messaging files (part of EUI in network 124) that came from computers (not shown) backed up onto network 124. A server or other computer (not shown) used for operating network 124 may identify messaging files on network 124 in a manner similar to file extraction engine 142. The server or other computer may search for files having file name extensions of "edb". After identifying the files, whether on backup tape 122, network 124, or both, the messaging files are sent from file extraction engine 142, network 124, or both to email extraction engine 146 at steps 206 and 222 in FIG. 2.

The data extraction is performed by email extraction engine 146 in a manner similar to the file extraction performed by file extraction engine 142 discussed previously. Similar to file extraction, extraction of electronic data from a messaging file can be performed without having to recreate the messaging environment, such as recreating hardware, software, and individual email accounts for each of the users.

Figure 2:
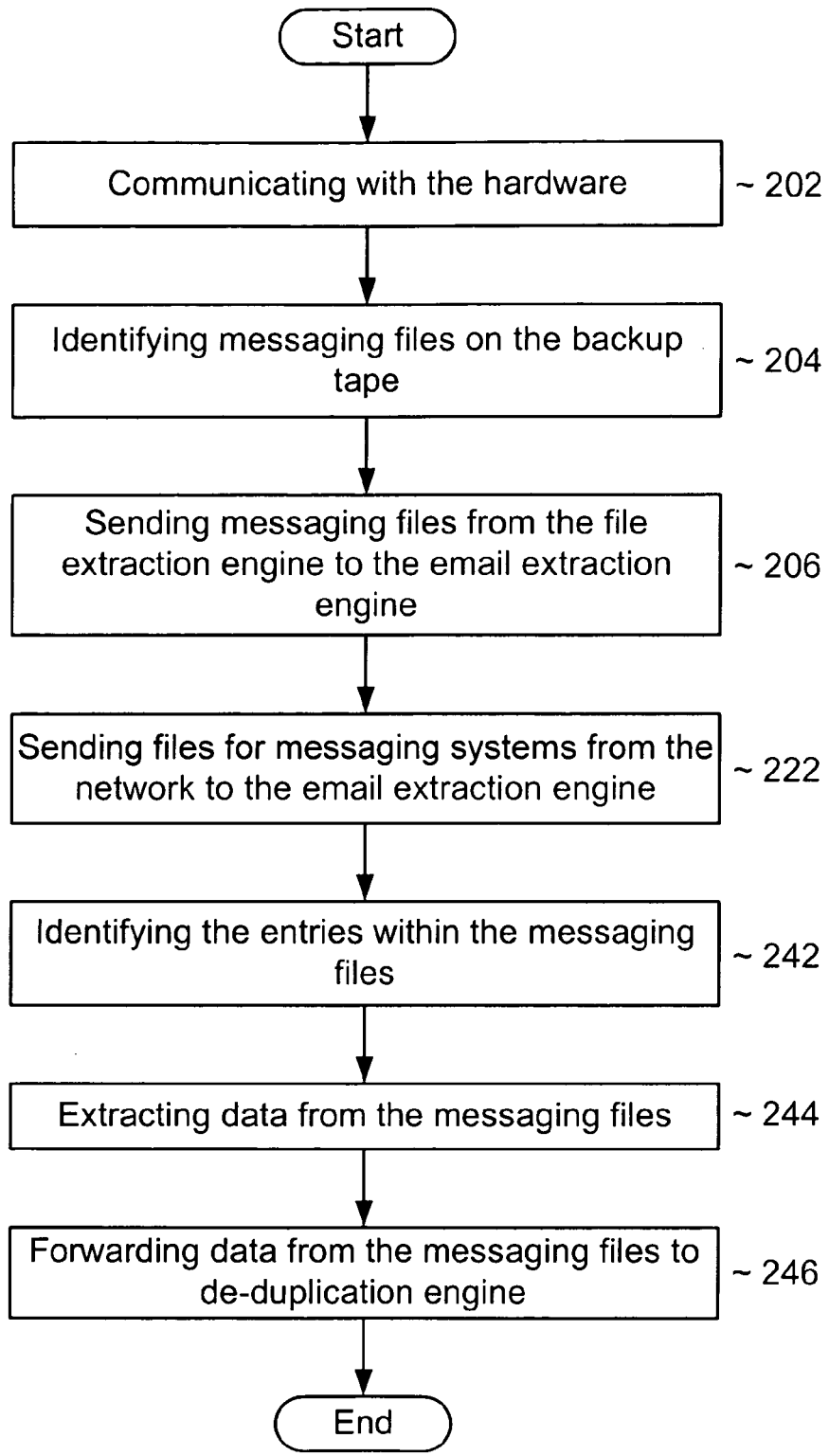
FIG. 2 includes a process flow diagram for extracting data from a non-native environment in accordance with an embodiment of the present invention.

As shown in one embodiment of FIG. 2, the method can include identifying the entries within the messaging files using email extraction engine 146 at step 242. The identification of the type of entry can be based on a sequence of data, a byte signature, or the like. Identifying signature is to be construed broadly to mean any information, whether a single character, combination of characters or other indicia (e.g., electronic signal(s)) when reading a messaging file that can be used, at least in part to identify the type of data within each entry within the messaging file. A software application can be used to convert the information to a format that is more user friendly. In one non-limiting embodiment, the hex editor may be used.

In one embodiment; the method and system can interpret/reverse engineer the raw data from the messaging files. The raw data and patterns of the raw data within the messaging files can be examined to determine the type of each entry (e.g., email messages, calendar item, address book entry, etc.) in the messaging file based on the logical format of the data. Different types of entries within the messaging files will have different attributes. For example, an email message may have attributes including addressee, addressor, copies (whether actual or blind copies ("bcc")), title, content, time sent, and potentially other attributes. A calendar item may have attributes including start time, end time, title, location, reminder, and potentially other attributes. An address book entry may have attributes including name, address, telephone number, fax number, mobile (cellular) number, email address, and potentially other attributes. Note that the email message may have only one time attribute, whereas a calendar item has two times attributes. Also, an address book entry has a telephone number attribute, which may not occur with an email message or calendar item. By examining the raw data and patterns within the messaging files, the type of entry can be determined.

After the type of entry is determined, a lookup table can be accessed to determine the logical format for the electronic data corresponding to the particular entry. The look up table may include information related to what the type of entry and where the attributes for that entry are located within the messaging file. In one embodiment, the method can also include extracting data from the message files using email extraction engine at step 244. The data can be extracted using the logical format to determine the attributes of the entry.

As shown in the embodiment of FIG. 2, the method can include forwarding the electronic data from email extraction engine 146 to de-duplication engine 144 at step 246. In one embodiment, after email extraction and de-duplication, the extracted, de-duplicated data may be used to create or populate table(s) within collective database 162. The division between the tables could be based on type of entry. In one embodiment, one table may include email messages, another table may include calendar items, still another table may include address book entries, etc. The table(s) in collective database 162 may be in a more usable format that can be searched for information.

Note that not all of the activities described above are required, that an element within a specific activity may not be required, and that further activities may be performed in addition to those illustrated. Still further, the order in which each of the activities are listed are not necessarily the order in which they are performed. After reading this specification, skilled artisans will be capable of determining what activities can be used for their specific needs.

Similar to file extraction, extraction of electronic data from a messaging file can be performed without having to recreate the messaging environment, such as recreating hardware, software, and personal email accounts for each of the users. Recreation of the messaging environment to restore backup data involves the procurement, setup and operation of messaging software, servers upon which to load the software, and databases upon which to store the messaging files, all of which are expensive and time consuming. The method obviates the need for those operations and costs, saving considerable time and money.

The system and method can be designed to allow for output into nearly any electronic format desired, which adds considerably more flexibility in use for the end user, as opposed to simply having a *.pst file full of email. Thus, the data from the messaging files can be extracted and put directly into the database without having to creating or recreate *.pst files.

Example

Figure 4:
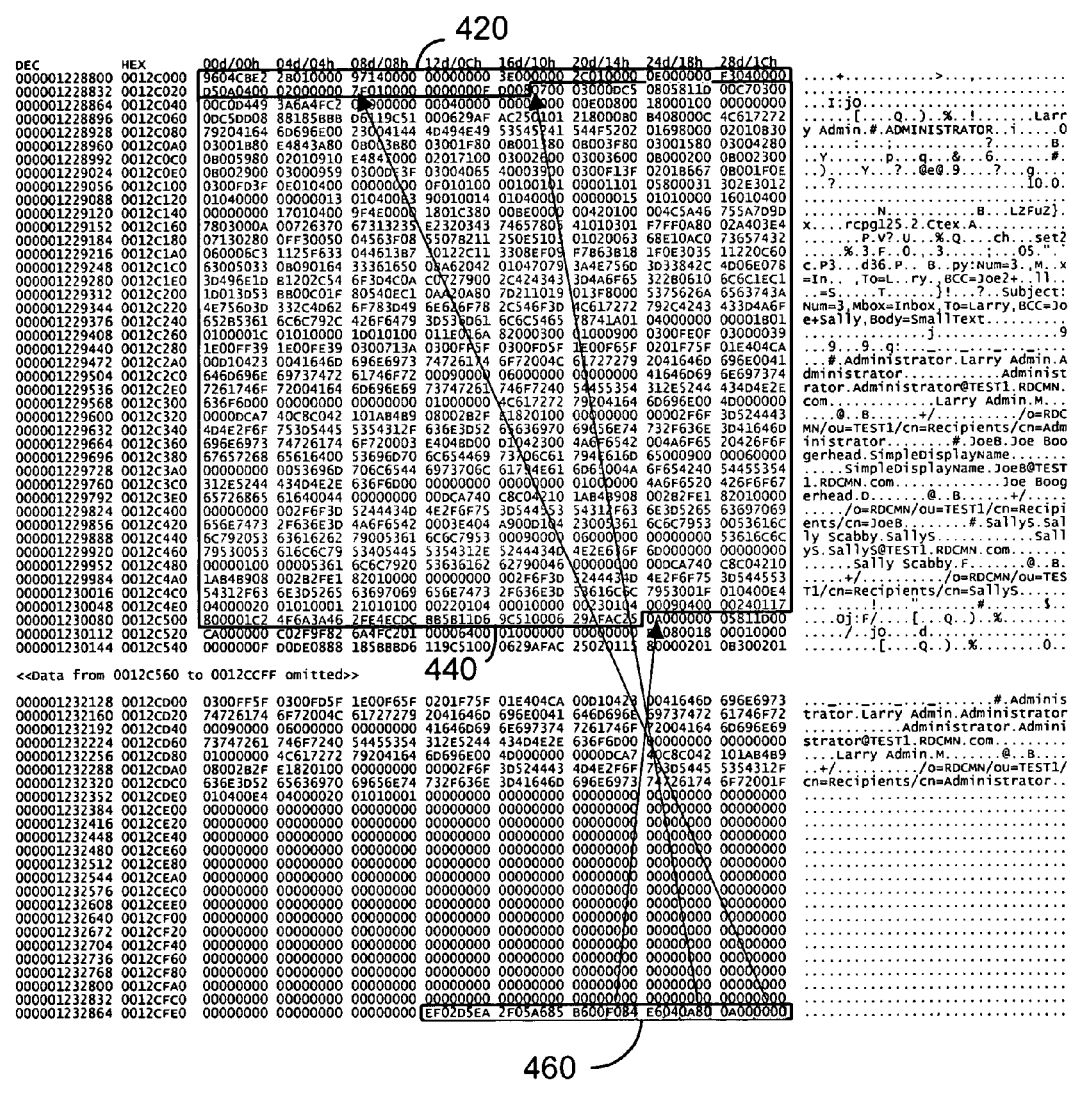

The example illustrates how information can be extracted from an EDB file. FIG. 4 includes an illustration of a display from a hex editor that includes information from a messages table of the EDB file. The illustration includes hexadecimal and ASCII values for the information. Knowledge of address and pointer numbering schemes used by microprocessors is conventional and well known in the art. The example includes data that may be used by a microprocessor made by Intel Corporation of Santa Clara, Calif.

Referring to the embodiment of FIG. 4, the entry for the first row and ninth column includes the database object name for the messages the value "0E000000" in the hex editor corresponds to a database object (b-tree) numbered "0x0000000E." For this particular EDB file, the database object is a messages (MSG) table. The data in the embodiment of FIG. 4 is split into three sections: the header (within box 420), the row pointers (within box 460), and table rows (including the data within box 440 and other data outside box 440) between the two. The header contains the current/next/previous page numbers, page flags, owning object/table ID, etc. The row pointers specify the location and length of each table row. The table rows contain each individual message. Rows can be further divided into fixed and variable length columns.

Referring to FIG. 4, the last pointer references information within the header. The penultimate pointer corresponds to a first message and has a hexadecimal value of "E6040A80." The last four characters (0A80) include information for an address pointer. The "8" is not used for determining address location but the 0, A, and 0 are. The "0A0" corresponds to the hexadecimal value of A, which is 10 in base-10. Therefore, the first message begins 10 bytes after the starting point from the last pointer. Each pair of hexadecimal characters corresponds to one byte. The "E604" corresponds to a hexadecimal value of 4E6. Therefore, the first message is 4E6 (hexadecimal bytes long).

The first message corresponds to box 440 and starts at with the "0700" characters at the end of the corresponding arrow in FIG. 4. Within the ASCII portion of the editor, the message is address to Larry (in Administration) with copies to Joe and Sally (both in TEST 1). Referring to the ASCII portion of FIG. 4, ten lines from the top include "LZFuZ." The "LZFu" denotes that the file has been compressed. A conventional decompression technique can be used to decompress the data so that the information for the message is in a more user friendly format. Information regarding the subject and content of the message can be seen and searched more easily.

Referring to the next row pointer ("B600F084"), the next message starts at 4F0 bytes from the beginning and has a length of B6 (hexadecimal) bytes. The file includes two other messages that correspond to the other two row pointers within box 460.

The owning object ID to table identifier mapping and the column identifier to MAPI identifier mappings are contained in a Msysobj table.

By knowing the conventions used for email files, such as EDB files, the techniques described herein can be used to obtain information from such email files without having to recreate individual email accounts.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method of obtaining data from a messaging file that was generated from a particular messaging environment, the method operated by a system comprising one or more computers, the method comprising the steps of:
   identifying a messaging file on an electronic storage media, the messaging file comprising data, the data organized into a plurality of entries;
   identifying a plurality of entries within the messaging file by examining the data of the messaging file, the identifying comprising identifying the type of data within at least two entries of the plurality of entries based at least in part on an identifying signature, wherein the type of data of one of the two entries is a calendar item entry and wherein the type of data of the remaining entries is selected from the group comprised of: an email message entry and an address book entry, wherein the identifying operation is performed by the system without the particular messaging environment used to create the messaging file,
      wherein when the type of data of at least one entry is an email message entry, the email message entry has at least one attribute selected from the group of: addressee, addressor, copies, title, content, and time sent;
      wherein when the type of data of at least one entry is an address book entry, the address book entry has at least one attribute selected from the group of: name, address, telephone number, fax number, mobile (cellular) number, and email address;
      wherein when the type of data of at least one entry is a calendar item, the calendar item entry has at least one attribute selected from the group of: start time, end time, title, location or reminder;
   accessing information to determine a logical format for the data corresponding to the type of data of the entry and to determine a location within the messaging file of an attribute of the entry;
   extracting the data corresponding to the plurality of entries identified within the messaging file, wherein the extracting operation is performed by the system without the particular messaging environment for the messaging file; and
   storing the data extracted in a different format, wherein the storing operation is performed by the system without the particular messaging environment for the messaging file.

2. The method of claim 1, further comprising communicating with hardware of a backup system.

3. The method of claim 1, wherein the messaging file originates from a backup storage medium or a network.

4. The method of claim 3, wherein:
   one entry has at least one different attribute compared to another entry.

5. The method of claim 4, wherein storing comprises storing the electronic data within a collective database.

6. The method of claim 1, further comprising de-duplicating the data before storing.

7. A data processing system having code embodied therein for obtaining data from a messaging file that was generated from a particular messaging environment of incompatible hardware and software configuration to that of the data processing system obtaining the data, the data processing system comprising:
   a memory configured to store the code;
   a processor for performing operations to identify a messaging file in accordance with the code, wherein the code further comprises:
   at least one instruction for identifying a messaging file on an electronic storage media, the messaging file comprising data, the data organized into a plurality of entries;
   at least one instruction for identifying a plurality of entries within the messaging file by examining the data of the messaging file, the identifying comprising identifying the type of data within at least two entries of the plurality of entries based at least in part on an identifying signature, wherein the type of data of one of the two entries is a calendar item entry and wherein the type of data of the remaining entries is selected from the group comprised of: an email message entry and an address book entry, wherein the identifying operation is performed by the processor without the particular messaging environment used to create the messaging file,
      wherein when the type of data of at least one entry is an email message entry, the email message entry has at least one attribute selected from the group of: addressee, addressor, copies, title, content, and time sent;
      wherein when the type of data of at least one entry is an address book entry, the address book entry has at least one attribute selected from the group of: name, address, telephone number, fax number, mobile (cellular) number, and email address;
      wherein when the type of data of at least one entry is a calendar item, the calendar item entry has at least one attribute selected from the group of: start time, end time, title, location or reminder;
   at least one instruction for accessing information to determine a logical format for the data corresponding to the type of data of the entry and to determine a location within the messaging file of an attribute of the entry;

at least one instruction for extracting the data corresponding to the entry, wherein the extraction is performed by the system that lacks the particular messaging environment for the messaging file; and at least one instruction for storing the data in a different format, wherein the storage is performed by the system that lacks the particular messaging environment for the messaging file.

8. The data processing system readable medium of claim 7, wherein the code further comprises at least one instruction for identifying a backup environment used to create a backup storage medium.

9. The data processing system readable medium of claim 7, wherein the messaging file originates from a backup storage medium or a network.

10. The data processing system readable medium of claim 9, wherein:
the at least one instruction for identifying a plurality of entries includes the two entities that are different;
and wherein at least two of the entries are different types of entries within the messaging file; and
one of the at least two entries has at least one different attribute compared to another of the at least two entries.

11. The data processing system readable medium of claim 10, wherein the at least one instruction for storing comprises at least one instruction for storing the data within a collective database.

12. The data processing system readable medium of claim 7, wherein the code further comprises at least one instruction for de-duplicating the data before executing the at least one instruction for storing.

13. A system for reading and obtaining data from a plurality of hardware and software systems used to operate communications generated in heterogeneous environments, the system comprising:
one or more computers with processing capability, the processing capability
identifying a communication file on an electronic storage medium, the communication file comprising data, the data organized into a plurality of entries;
the processing capability further configured to identify a plurality of entries within the communication file, the identifying comprising identifying the type of data within at least two entries of the plurality of entries based at least in part on an identifying signature, wherein the type of data of one of the two entries is a calendar item entry and wherein the type of data of the remaining entries is selected from the group comprised of: an email message entry and an address book entry, wherein the identifying operation is performed by the processing capability without the particular environment used to create the communication file,
wherein when the type of data of at least one entry is an email message entry, the email message entry has at least one attribute selected from the group of: addressee, addressor, copies, title, content, and time sent;
wherein when the type of data of at least one entry is an address book entry, the address book entry has at least one attribute selected from the group of: name, address, telephone number, fax number, mobile (cellular) number, and email address;
wherein when the type of data of at least one entry is a calendar item, the calendar item entry has at least one attribute selected from the group of: start time, end time, title, location or reminder;
the processing capability further configured to access information to determine the logical format for the data corresponding to the type of data of the entry and to determine a location within the communication file of an attribute of the entry;
an extraction engine configured to extract data corresponding to the entry identified within the communication file, from any environment; and
a target storage medium for storing the data extracted in a format, different from the format in which the communication was generated, to enable users to interpret the data without reliance on the communication environment used to generate the communication file.

14. The system of claim 13, further comprising hardware of a backup system with which the system communicates.

15. The system of claim 13, wherein the messaging file originates from a backup storage medium or a network.

16. The system of claim 15, wherein the processor capability identifies a plurality of entries, wherein at least two of the entries are different types of entries within the communication file; and one of the at least two entries has at least one different attribute compared to another of the at least two entries.

17. The system of claim 16, wherein the system stores the data within a collective database.

18. The system of claim 13, further comprising:
de-duplicating software for de-duplicating the data before storing.

* * * * *